United States Patent
Tai et al.

(10) Patent No.: US 11,886,091 B2
(45) Date of Patent: Jan. 30, 2024

(54) FRONT LIGHT MODULE AND ELECTROPHORETIC DISPLAY

(71) Applicant: E Ink Holdings Inc., Hsinchu (TW)

(72) Inventors: Sheng-Chieh Tai, Hsinchu (TW); Ching-Huan Liao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/902,913

(22) Filed: Sep. 5, 2022

(65) Prior Publication Data

US 2023/0205039 A1   Jun. 29, 2023

(51) Int. Cl.
G02F 1/1677   (2019.01)
F21V 8/00     (2006.01)
G02F 1/167    (2019.01)

(52) U.S. Cl.
CPC ......... G02F 1/1677 (2019.01); G02B 6/0043 (2013.01); *G02F 1/167* (2013.01)

(58) Field of Classification Search
CPC ...... G02B 6/0043; G02F 1/1677; G02F 1/167
See application file for complete search history.

(56) References Cited

U.S. PATENT DOCUMENTS

| | | | | |
|---|---|---|---|---|
| 6,027,220 A * | 2/2000 | Arai | ...................... | G02B 6/0056 362/617 |
| 6,752,505 B2 * | 6/2004 | Parker | ................... | A61M 21/02 362/330 |
| 7,151,580 B2 | 12/2006 | Ueki et al. | | |
| 7,633,679 B2 * | 12/2009 | Mi | ....................... | G02B 6/0056 359/485.02 |
| 7,871,680 B2 * | 1/2011 | Kinoshita | ............ | G02B 6/0053 428/411.1 |
| 9,086,535 B2 * | 7/2015 | Sherman | .............. | G02B 6/0055 |
| 9,188,721 B2 | 11/2015 | Asano et al. | | |
| 9,535,205 B2 * | 1/2017 | Huang | .................... | G02B 6/005 |
| 10,782,466 B2 * | 9/2020 | Wang | .................. | G02B 6/0076 |
| 11,009,645 B2 * | 5/2021 | Li | .......................... | G02B 5/045 |
| 11,099,314 B2 * | 8/2021 | Epstein | ................ | G02B 6/0038 |
| 2022/0269132 A1 * | 8/2022 | Liu | ................... | G02F 1/133607 |

FOREIGN PATENT DOCUMENTS

| | | |
|---|---|---|
| CN | 113678034 | 11/2021 |
| JP | 2003149643 | 5/2003 |
| TW | 568993 | 1/2004 |
| TW | 201514597 | 4/2015 |

OTHER PUBLICATIONS

"Office Action of Taiwan Counterpart Application", dated Sep. 20, 2022, p. 1-p. 10.

* cited by examiner

*Primary Examiner* — Arman B Fallahkhair
(74) *Attorney, Agent, or Firm* — JCIPRNET

(57) ABSTRACT

A front light module including a light guide plate, a light source, an optical film, and a first optical clear adhesive is provided. The light guide plate has a top surface, a bottom surface opposite to the top surface, and a light input surface connecting the top surface with the bottom surface. The light source is disposed beside the light input surface. An optical surface of the optical film facing away from the light guide plate has a plurality of optical microstructures. Each of the optical microstructures is a recess, and has a light receiving surface more adjacent to the light input surface and a light back surface further away from the light input surface. The optical clear adhesive is disposed between the light guide plate and the optical film in a fully bonding manner. An electrophoretic display is also provided.

15 Claims, 4 Drawing Sheets

FRONT LIGHT MODULE AND ELECTROPHORETIC DISPLAY

CROSS-REFERENCE TO RELATED APPLICATION

This application claims the priority benefit of Taiwan application serial no. 110148373, filed on Dec. 23, 2021. The entirety of each of the above-mentioned patent applications is hereby incorporated by reference herein and made a part of this specification.

BACKGROUND

Technical Field

The disclosure relates to a light module and display, and in particular to a front light module and an electrophoretic display.

Description of Related Art

For reflective displays, if users want to watch under low ambient light, a front light module can be arranged in front of the reflective display panel, and the light emitted by the front light module can be used to illuminate the reflective display panel.

In the conventional front light module, a light guide plate is provided, and the light source emits light beams toward the side of the light guide plate. After the light beam enters the light guide plate, a part of the light will be scattered down to the reflective display panel by the microstructures on the front or back of the light guide plate, and become effective light reflected by the reflective display panel. However, there is another part of the light beam that is directly scattered upward by the microstructures and is not transmitted to the reflective display panel. This part of the light beam will form invalid light and cause the contrast of the reflective display to decrease.

SUMMARY

The application provides a front light module, which can effectively improve the contrast of the display.

The application provides an electrophoretic display, which has a high contrast.

An embodiment of the present application provides a front light module including a light guide plate, a light source, an optical film, and a first optical clear adhesive. The light guide plate has a top surface, a bottom surface opposite to the top surface, and a light input surface connecting the top surface with the bottom surface. The light source is disposed beside the light input surface and is configured to emit a light beam to the light input surface. An optical surface of the optical film facing away from the light guide plate has a plurality of optical microstructures. Each of the optical microstructures is a recess, and has a light receiving surface more adjacent to the light input surface and a light back surface further away from the light input surface. The light receiving surface is inclined 20 to 40 degrees with respect to the light guide plate, and the light back surface is inclined 70 to 90 degrees with respect to the light guide plate. The optical clear adhesive is disposed between the light guide plate and the optical film in a fully bonding manner.

An embodiment of the present application provides an electrophoretic display including an electrophoretic display panel and the above-mentioned front light module. The front light module is disposed on the electrophoretic display panel, and the bottom surface of the light guide plate faces the electrophoretic display panel.

In the front light module and the electrophoretic display of the embodiment of the present application, the optical microstructures with the light receiving surface and the backlight surface are used to reflect the light beam emitted from the top surface of the light guide plate to the bottom surface, thereby reducing the invalid light directly emitted from the top surface of the light guide plate. Therefore, the front light module of the embodiment of the invention can effectively improve the contrast of the display, while the electrophoretic display of the embodiment of the present application has a higher contrast.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
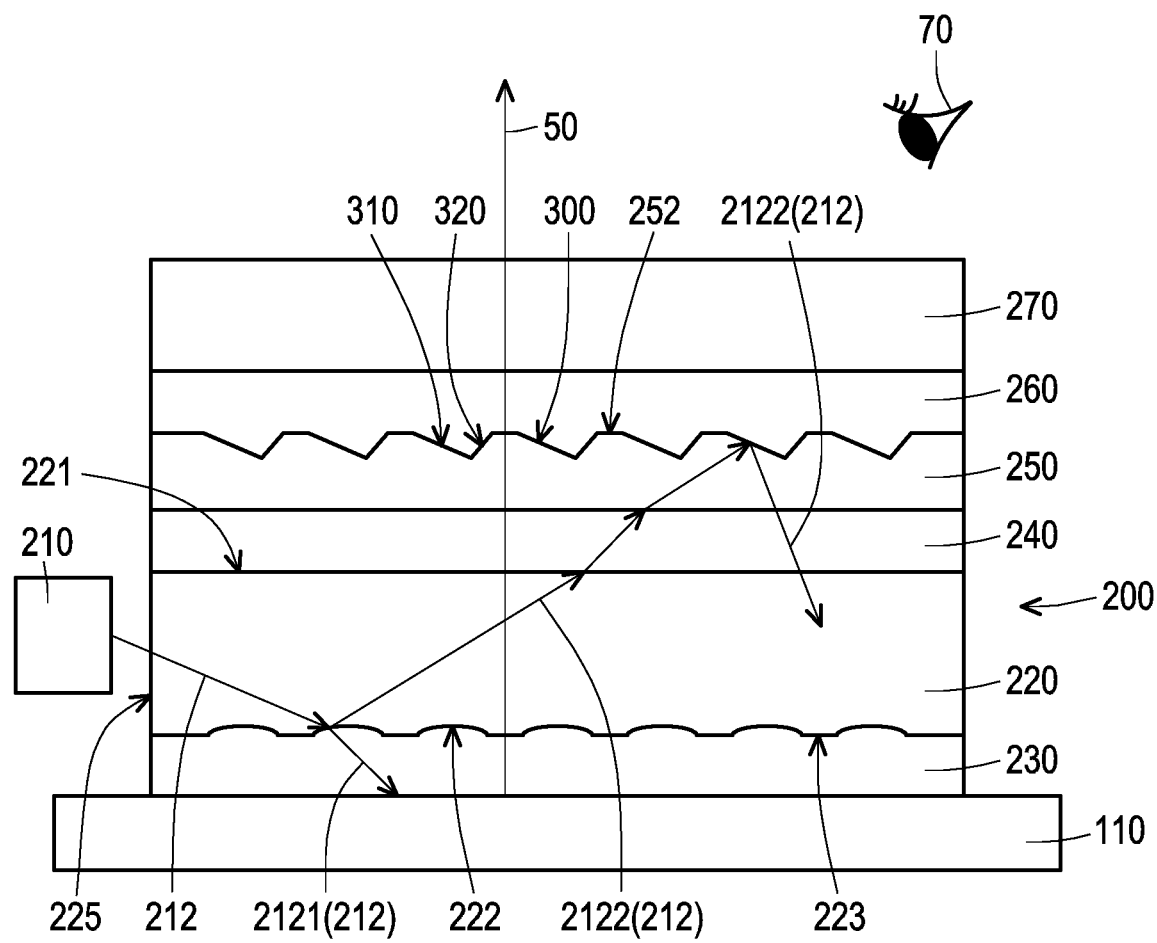
FIG. 1 is a schematic cross-sectional view of the electrophoretic display according to an embodiment of the present application.
Figure 2:
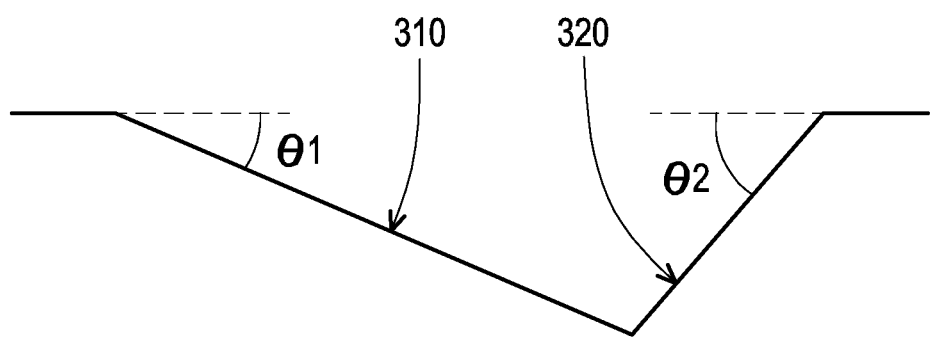
FIG. 2 is a schematic cross-sectional view of the optical microstructure in FIG. 1.

FIG. 1 is a schematic cross-sectional view of the electrophoretic display according to an embodiment of the present application. FIG. 2 is a schematic cross-sectional view of the optical microstructure in FIG. 1, and FIG. 3A to 3C are schematic top views of three embodiments of the optical microstructure in FIG. 1. Referring to FIG. 1, FIG. 2 and FIG. 3A to 3C, the electrophoretic display 100 of this embodiment includes an electrophoretic display panel 110 and a front light module 200. The front light module 200 is disposed on the electrophoretic display panel 110, and the front light module 200 includes a light guide plate 220, a light source 210, an optical film 250, and a first optical clear adhesive 240. The light guide plate 220 has a top surface 221, a bottom surface 223 opposite to the top surface 221, and a light input surface 225 connecting the top surface 221 with the bottom surface 223, wherein the bottom surface 223 faces the electrophoretic display panel 110. The light source 210 is disposed beside the light input surface 225 and is configured to emit a light beam 212 to the light input surface 225.

In the embodiment, the light source 210 is, for example, a light emitting diode, a cold cathode fluorescent tube, or other suitable light emitting elements. Besides, in the embodiment, at least one of the top surface 221 and the bottom surface 223 of the light guide plate 220 has a plurality of scattering microstructures 222 (the bottom surface 223 has a scattering microstructure 222 as an example in FIG. 1). The light beam 212 that enters the light guide plate 220 from the light input surface 225 is continuously totally reflected by the top surface 221 and the bottom surface 223 and is transmitted in the light guide plate 220. The scattering microstructure 222 destroys the total reflection and scatters the light beam 212 toward the direction of the electrophoretic display panel 110 (such as the light beam 2121 shown in FIG. 1), or scatter away from the electrophoretic display panel 110 (such as the light beam 2122 shown in FIG. 1). The light beam 2121 scattered toward the direction of the electrophoretic display panel 110 illuminates the electrophoretic display panel 110 and is reflected by the electrophoretic display panel 110 into image light 50. The image light 50 may penetrate the light guide plate 220 and is transmitted to the eyes of a user outside, so that the user can view the image displayed on the electrophoretic display panel 110.

The optical surface 252 of the optical film 250 opposite to the light guide plate 220 has a plurality of optical microstructures 300. Each optical microstructure 300 is a recess, and has a light receiving surface 310 closer to the light input surface 225 and a light back surface 320 farther from the light input surface 225. The light receiving surface 310 is inclined at an angle θ1 relative to the light guide plate 220, wherein the angle θ1 falls within the range of 20 to 40 degrees. The light back surface 320 is inclined at an angle θ2 relative to the light guide plate 220, wherein the angle θ2 falls within the range of 70 to 90 degrees. In the embodiment, the optical microstructures 300 can be manufactured by a hot-pressing process or an ultraviolet (UV) embossing method. The first optical clear adhesive 240 is disposed between the light guide plate 220 and the optical film 250 in a fully bonding manner. In the embodiment, the first optical clear adhesive 240 is fully laminated with the light guide plate 220 and the optical film 250. Full lamination refers to the glue material with the first optical clear adhesive 240 between the light guide plate 220 and the optical film 250, and there is no air gap.

After the light beam 212 enters the light guide plate 220 from the light input surface 225, part of the light beam leaves the light guide plate 220 from the top surface 221 and enters the optical film (for example, the light beam 2122 scattered by the scattered microstructure 222 in a direction away from the electrophoretic display panel 110). Then at least part of the light beam 2122 is reflected by these optical microstructures 300 toward the bottom surface 223, for example, most of the light beam 2122 is reflected by the light receiving surface 310 toward the bottom surface 223. The light beam 2122 reflected by the bottom surface 223 may penetrate the light guide plate 220 and be transmitted to the electrophoretic display panel 110 to illuminate the electrophoretic display panel 110. The electrophoretic display panel 110 then reflects the light beam 2122 into image light 50. As a result, at least a part of the light beam 2122 scattered by the scattering microstructure 222 of the light guide plate 220 in the direction away from the electrophoretic display panel 110 will be reflected by the optical microstructures 300 to the electrophoretic display panel 110, thereby becoming the image light 50 (that is, effective light), but not invalid light. As the image light 50 increases and the invalid light decreases, the contrast of the electrophoretic display 100 of the embodiment can be effectively improved.

Compared with an electrophoretic display that does not use the optical film 250 and the optical microstructures 300, the ratio of effective light to invalid light is, for example, 47%/53%=0.87. In the embodiment, the ratio of effective light to invalid light of the electrophoretic display 100 using the optical film 250 and optical microstructures 300 is, for example, 65%/35%=1.86. That is, in comparison, the effective light ratio of the electrophoretic display 100 of the embodiment is increased by about 18%. Therefore, the contrast value of the electrophoretic display 100 can indeed be greatly improved.

Figure 3A:
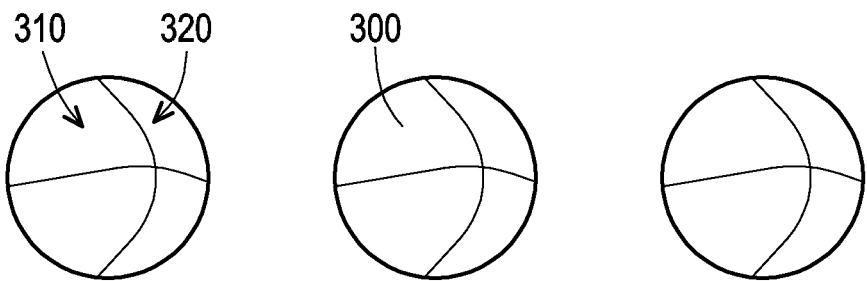
FIG. 3A to 3C are schematic top views of three embodiments of the optical microstructure in FIG. 1.
Figure 3B:
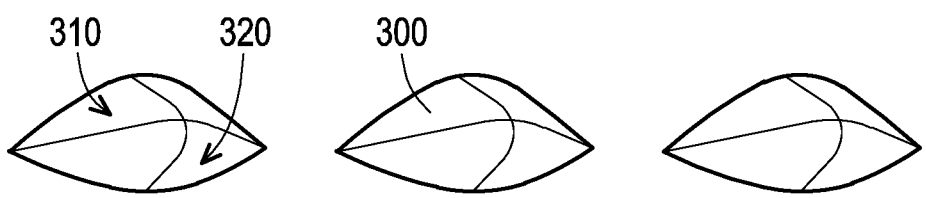
Figure 3C:
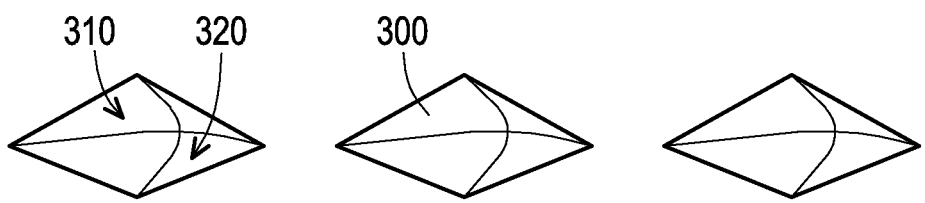

In the embodiment, the cross-section of the optical microstructures 300 is in the shape of a scallop, as shown in FIG. 1 and FIG. 2. On the other hand, in the embodiment, the top view of each optical microstructure 300 (that is, the view viewed from the top of FIG. 1 toward the electrophoretic display panel 110) is circular (as shown in FIG. 3A), quadrilateral (as shown in FIG. 3C), fusiform (as shown in FIG. 3B), or other shapes. In addition, the density of the optical microstructures 300 and the scattering microstructures 222 may change differently according to the position or present a consistent state according to the position. For example, the density of the optical microstructures 300 and the scattering microstructures 222 may increase from density to density as they move away from the light input surface 225, so that the light beam 212 emitted by the light source 210 can be uniformly illuminated on the electrophoretic display panel 110.

In the embodiment, the front light module 200 further includes an anti-glare layer 270 and a second optical clear adhesive 260. The anti-glare layer 270 is disposed on the optical film 250, which can prevent human eyes from seeing the glare of the electrophoretic display 100 due to the strong light in the reflective environment. The anti-glare layer 270 may be an anti-glare film that is well known to those with ordinary knowledge in the art, and therefore its details will not be described in detail here. The second optical clear adhesive 260 is disposed between the optical film 250 and the anti-glare layer 270 in a fully bonding manner. In the embodiment, the material of the second optical clear adhesive 260 is filled in the recesses of these optical microstructures 300. In other words, there is no air gap between the optical film 250 and the anti-glare layer 270.

In the embodiment, the electrophoretic display 100 further includes a third optical clear adhesive 230, which is disposed between the light guide plate 220 and the electrophoretic display panel 110 in a fully bonding manner. In the embodiment, the third optical clear adhesive 230 is fully bonded to bond the light guide plate 220 and the electrophoretic display panel 110.

In the embodiment, the refractive index of the optical film 250 is greater than the refractive index of the first optical clear adhesive 240. In addition, the refractive index of the optical film 250 is greater than the refractive index of the second optical clear adhesive 260. In one embodiment, the refractive indexes of the first optical clear adhesive 240, the second optical clear adhesive 260, and the third optical clear adhesive e 230 fall within the range of 1.3 to 1.6.

Figure 4:
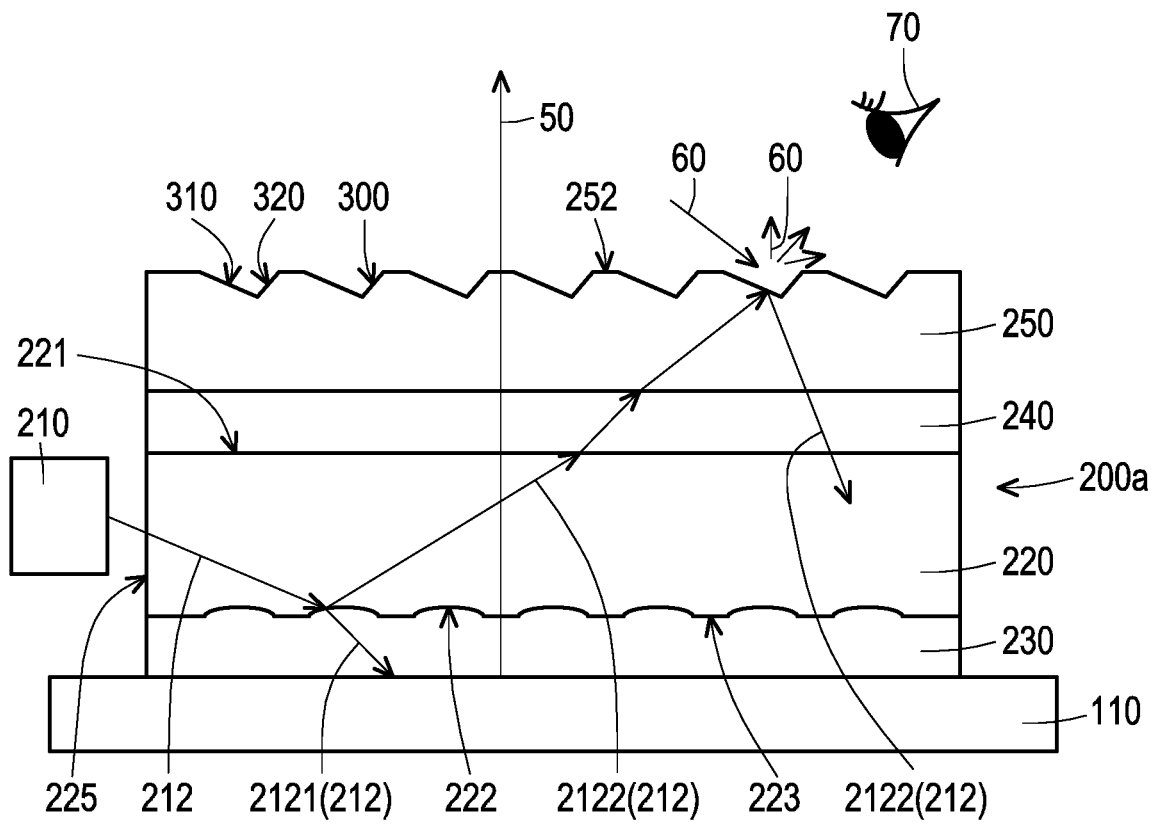
FIG. 4 is a schematic cross-sectional view of the electrophoretic display according to another embodiment of the present application.

FIG. 4 is a schematic cross-sectional view of the electrophoretic display according to another embodiment of the present application. Referring to FIG. 4, the electrophoretic display 100a of the embodiment is similar to the electrophoretic display 100 of FIG. 1, and the differences between the two are as follows. In the front light module 200a of the electrophoretic display 100a of the embodiment, the optical film 250 is an anti-glare layer located on the outermost side of the electrophoretic display 100a. The optical microstructures 300 can not only reflect the light beam 2122 transmitted upward from the light guide plate 220, but also diffuse the ambient light Therefore, the user's eyes 70 will not see glare, so as to achieve the anti-glare effect.

In summary, in the front light module and the electrophoretic display of the embodiment of the present application, the optical microstructures with the light receiving surface and the backlight surface are used to reflect the light beam emitted from the top surface of the light guide plate to the bottom surface, thereby reducing the invalid light directly emitted from the top surface of the light guide plate. Therefore, the front light module of the embodiment of the invention can effectively improve the contrast of the display, while the electrophoretic display of the embodiment of the present application has a higher contrast.

What is claimed is:

1. A front light module, comprising:
   a light guide plate having a top surface, a bottom surface opposite to the top surface, and a light input surface connecting the top surface with the bottom surface;
   a light source, disposed beside the light input surface and configured to emit a light beam to the light input surface;
   an optical film facing away from an optical surface of the light guide plate has a plurality of optical microstructures, and each of the optical microstructures is a recess, and has a light receiving surface more adjacent to the light input surface and a light back surface further away from the light input surface, wherein the light receiving surface is inclined 20 to 35 degrees with respect to the top surface of the light guide plate, and the light back surface is inclined 70 to 90 degrees with respect to the top surface of the light guide plate; and
   a first optical clear adhesive, disposed between the light guide plate and the optical film in a fully bonding manner.

2. The front light module according to claim 1, further comprises:
   an anti-glare layer, disposed on the optical film; and
   a second optical clear adhesive, disposed between the optical film and the anti-glare layer in a fully bonding manner.

3. The front light module according to claim 2, wherein the material of the second optical clear adhesive is filled in the recess of the optical microstructures.

4. The front light module according to claim 1, wherein the optical film is an anti-glare layer.

5. The front light module according to claim 1, wherein at least one of the top surface and the bottom surface of the light guide plate has multiple scattering microstructures.

6. The front light module according to claim 1, wherein the refractive index of the optical film is greater than the refractive of the first optical clear adhesive.

7. The front light module according to claim 1, wherein the top view of each optical microstructure is circular, quadrilateral or fusiform.

8. An electrophoretic display, comprising:
   an electrophoretic display panel; and
   a light front module, disposed on the electrophoretic display panel, the light front module comprises:
   a light guide plate having a top surface, a bottom surface opposite to the top surface, and a light input surface connecting the top surface with the bottom surface;
   a light source, disposed beside the light input surface and configured to emit a light beam to the light input surface;
   an optical film facing away from an optical surface of the light guide plate has a plurality of optical microstructures, and each of the optical microstructures is a recess, and has a light receiving surface more adjacent to the light input surface and a light back surface further away from the light input surface, wherein the light receiving surface is inclined 20 to 35 degrees with respect to the top surface of the light guide plate, and the light back surface is inclined 70 to 90 degrees with respect to the top surface of the light guide plate; and
   a first optical clear adhesive, disposed between the light guide plate and the optical film in a fully bonding manner.

9. The electrophoretic display according to claim 8, wherein the front light module further comprises:
   an anti-glare layer, disposed on the optical film; and
   a second optical clear adhesive, disposed between the optical film and the anti-glare layer in a fully bonding manner.

10. The electrophoretic display according to claim 9, wherein the material of the second optical clear adhesive is filled in the recess of the optical microstructures.

11. The electrophoretic display according to claim 8, wherein the optical film is an anti-glare layer.

12. The electrophoretic display according to claim 8, wherein at least one of the top surface and the bottom surface of the light guide plate has multiple scattering microstructures.

13. The electrophoretic display according to claim 8, wherein the refractive index of the optical film is greater than the refractive of the first optical clear adhesive.

14. The electrophoretic display according to claim 8, wherein the top view of each optical microstructure is circular, quadrilateral or fusiform.

15. The electrophoretic display according to claim 8, further comprises a third optical clear adhesive, disposed between the light guide plate and the electrophoretic display panel in a fully bonding manner.

* * * * *

UNITED STATES PATENT AND TRADEMARK OFFICE
CERTIFICATE OF CORRECTION

| | | |
|---|---|---|
| PATENT NO. | : 11,886,091 B2 | |
| APPLICATION NO. | : 17/902913 | |
| DATED | : January 30, 2024 | |
| INVENTOR(S) | : Sheng-Chieh Tai et al. | |

It is certified that error appears in the above-identified patent and that said Letters Patent is hereby corrected as shown below:

On the Title Page

Item (30) Foreign Application Priority Data should read: Dec. 23, 2021 (TW) ......110148373

Signed and Sealed this
Sixteenth Day of April, 2024

Katherine Kelly Vidal
*Director of the United States Patent and Trademark Office*